United States Patent [19]

Suzuki

[11] 4,163,389

[45] Aug. 7, 1979

[54] METHOD AND APPARATUS FOR ELECTRICAL MEASUREMENT OF FLUID FLOW RATE

[75] Inventor: Suzuo Suzuki, Yokosuka, Japan

[73] Assignee: Nissan Motor Company, Limited, Japan

[21] Appl. No.: 862,983

[22] Filed: Dec. 21, 1977

[30] Foreign Application Priority Data

Dec. 23, 1976 [JP] Japan .................................. 51/154330

[51] Int. Cl.² ................................................ G01F 1/64
[52] U.S. Cl. .................................. 73/194 F; 73/194 E
[58] Field of Search ........................... 73/194 F, 194 E

[56] References Cited
U.S. PATENT DOCUMENTS

| | | |
|---|---|---|
| 3,688,106 | 8/1972 | Brain .................................. 73/194 F |
| 3,831,445 | 8/1974 | Durbin ............................... 73/194 F |
| 3,839,910 | 10/1974 | Fitch .............................. 73/194 F X |

*Primary Examiner*—Charles A. Ruehl
*Attorney, Agent, or Firm*—Lowe, King, Price & Becker

[57] ABSTRACT

Flow rate in a fluid passage is measured by making corona discharge in a section of the fluid passage to cause partial ionization of the fluid and measuring a current produced in a DC circuit including a pair of electrodes disposed in the fluid passage downstream of the corona discharge section. Variations in the relationship between the measured current and the flow rate with difference in inherent conductivity among fluids are evadable by measuring a basic current through the DC circuit while the corona discharge is interrupted and regulating a voltage for either ionization or measurement based on the basic current.

10 Claims, 6 Drawing Figures

METHOD AND APPARATUS FOR ELECTRICAL MEASUREMENT OF FLUID FLOW RATE

BACKGROUND OF THE INVENTION

This invention relates to a method and apparatus for electrical measurement of the rate of a flow of liquid or gas.

In internal combustion engines, an intake system usually includes a fuel metering device or an air-fuel proportioning device such as a carburetor or an electronically controlled fuel injector to feed the engine with an air-fuel mixture of a predetermined air/fuel ratio. In recent years, there is a strong and growing demand for improvement on the precision in the control of the air/fuel ratio particularly in automotive internal combustion engines, since the improvement is almost a requisite to the success in reducing harmful components of the exhaust gas and lessening the fuel consumption to the extent of fully meeting current requirements without substantial sacrifice of the operability of the engines.

To maintain the air/fuel ratio exactly at a predetermined value, there is a need of precisely adjusting the fuel supply rate to changes in the quantity of air being admitted into the engine. Accordingly there is a great need for the development of improved measuring instruments which are high in precision, good at response and are really adapted to measurement of volumetric flow rates of air and liquid fuel in intake systems of automotive internal combustion engines.

Conventional flow rate measuring instruments are generally unsuitable for use in association with automotive internal combustion engines, for example as a component of a carburetor, mainly from the following reasons. First, their responsiveness is insufficient to follow such transient variations as occur in the flow rate of air and/or fuel in automotive engine intake systems. For example, a flow meter of the so-called burette type, in which a rotatable or swingable measure is cyclically filled with a flowing fluid and emptied to represent the rate of the flow by the amount of time taken by one cycle of this work, cannot detect a momentary flow rate but can only indicate an average flow rate during 10–60 seconds. Second, they are generally large in size, heavy in weight and, because of having mechanically moving parts, complicated in structure.

SUMMARY OF THE INVENTION

It is an object of the present invention to provide a novel method of measuring the rate of a fluid flow accurately, quickly and easily.

It is another object of the invention to provide a method of electrically measuring the rate of a fluid flow without using any mechanically moving element.

It is a still another object of the invention to provide an electrical apparatus for measuring the rate of a fluid flow, which apparatus is good at both accuracy and responsiveness and has a simple construction needing no mechanically moving parts.

It is a still further object of the invention to provide an electrical apparatus for measuring the rate of a fluid flow, which apparatus is suitable for use in automotive engine intake systems in respects of both construction and performance.

A flow rate measuring method according to the invention comprises the steps of preparing a DC circuit to allow a current to flow across a flow of a fluid at a section thereof, continually making corona discharge in another section of the fluid flow upstream of the aforementioned section to partially ionize the fluid such that a constant quantity of ions per unit volume of the fluid are formed, and measuring a current flowing through the DC circuit due to the presence of ions in the fluid traversing the circuit.

The measured current represents the rate of the fluid flow since the intensity of this current is proportional to the quantity of ions passing through the measurement section per unit time and this quantity of ions is proportional to the volume of the fluid passing through this section per unit time. Thus it is possible to measure a momentary flow rate by this method.

A flow rate apparatus according to the invention comprises a combination of two electrodes spaced and disposed in a section of a fluid passage, first means for continually making corona discharge across the two electrodes to partially ionize the fluid such that a constant quantity of ions per unit volume of the fluid are formed, a pair of electrodes, referred to as measurement electrodes, spaced and disposed in the fluid passage at a section downstream of the corona discharge section, second means for applying a constant DC voltage to the measurement electrodes, and third means for measuring a current flowing between the measurement electrodes due to the presence of ions in the fluid passing through the gap between the measurement electrodes.

A resistor connected in series with the measurement electrodes serves as the third means of this apparatus since the aforementioned current is represented by a voltage across this resistor.

As can be seen from the above description, a flow rate measuring apparatus of the invention includes no mechanically moving elements (other than switches) and operates on an electrical principle. Accordingly this apparatus exhibits a quick response, high sensitivity and high accuracy. Besides, this apparatus offers little resistance to the fluid flow. Since this apparatus is very simple in construction, it can be embodied into a compact, light, stable and durable instrument adapted to, for example, a carburetor for automotive internal combustion engines.

Optionally, this apparatus may be constructed to have an adjustment function with the purpose of maintaining a definite relationship between the flow rate and the intensity of the measured current even when a change occurs in inherent conductivity of a fluid subject to measurement.

DESCRIPTION OF PREFERRED EMBODIMENTS

Figure 1:
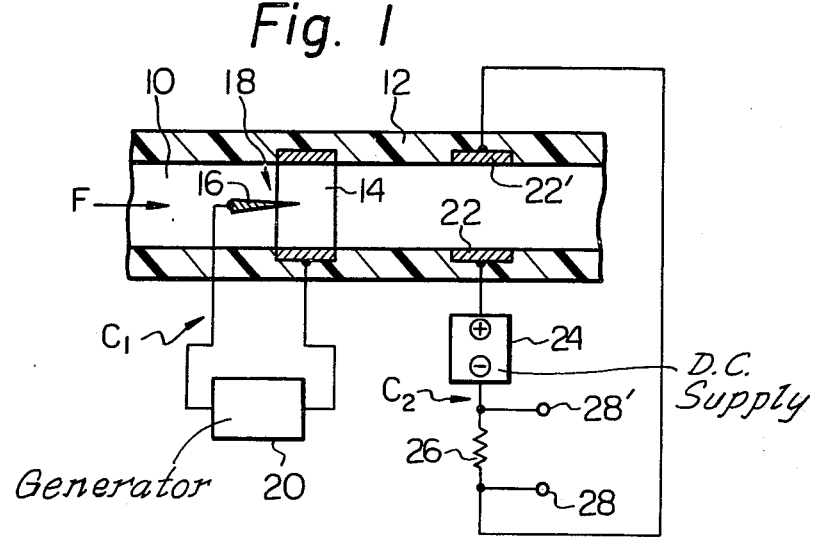
FIG. 1 is a schematic and sectional view of a fluid passage equipped with a flow rate measuring apparatus as an embodiment of the invention.

In FIG. 1, a fluid passage 10 is given as the interior of a cylindrical pipe 12 so as to allow a fluid to flow in the direction indicated by the arrow F. An electrode member 14 having the shape of a hollow cylinder with approximately the same inner diameter as the pipe 12 is fitted coaxially to the inside of the pipe 12, and another electrode member 16 of a needle shape is fixedly disposed in the fluid passage 10 such that a tip portion of this electrode 16 intrudes into the cylindrical electrode 14. When the pipe 10 is of a conducting material, these electrodes 14, 16 and/or leads for them are electrically isolated from the pipe 10 by means of suitable insulators (not shown). The two electrodes 14 and 16 are connected to a high voltage generator 20 placed outside the pipe 12. The voltage generator 20 may be either a DC voltage generator or an AC voltage generator insofar as it can develop a high voltage of several kilovolts or more than ten kilovolts (depending mainly on the kind of the fluid flowing in the passage 10). The two electrodes 14, 16 and the high voltage generator 20 constitute a corona discharge circuit $C_1$ as part of a flow rate measuring apparatus according to the invention, so that the two electrodes 14, 16 will be referred to collectively as electrode assembly 18 for corona discharge. A current measurement circuit $C_2$ as another part of the flow rate measuring apparatus comprises a pair of electrode members 22 and 22' each of which in this example is a plate received in a recess formed on the inside of the pipe 12 at a section downstream of the corona discharge electrode assembly 18. The electrode 22 is connected to the positive terminal of a DC power supply 24 which is placed outside the pipe 12 and develops a constant voltage of several kilovolts, and the electrode 22' is connected to the negative terminal of the power supply 24 through a load resistor 26. The two electrodes 22, 22' will be referred to collectively as measurement electrodes. Indicated at 28 is a junction between the electrode 22' and the resistor 26, and 28' is a junction between the DC power supply 24 and the resistor 26. These junctions 28, 28' serve as output terminals of the current measurement circuit $C_2$ and accordingly of the flow rate measuring apparatus.

The flow rate measuring apparatus of FIG. 1 operates on the following principle.

A high voltage of, for example, about 5 kV developed by the generator 20 is impressed across the two electrodes 14, 16 while a fluid flows as indicated by the arrow F in the passage 10. The magnitude of the voltage is determined in dependence on the kind of the fluid and design of the electrode assembly 18 so as to be sufficient for causing corona discharge between the two electrodes 14, 16. The corona discharge causes a partial ionization of the fluid particles, and ions formed in the fluid are carried downstream by the flow of the fluid.

A constant DC high voltage of, for example, about 5 kV is applied to the measurement electrodes 22, 22' from the power supply 24, so that an electric field is produced in the fluid passage 10 between the electrodes 22 and 22'. The ions formed by the corona discharge come into this electric field and then are attracted to either of the two measurement electrodes 22, 22', so that a current flows between the electrodes 22, 22', that is, through the measurement circuit $C_2$. The intensity of this current is proportional to the quantity of the ions contained in a volume of the fluid, and this quantity of the ions is proportional to the volume rate of flow of the fluid. Accordingly the volume flow rate of the fluid can be detected by measuring the intensity of this current (usually tens of microamperes) represented by a voltage across the load resistor 26, i.e. a voltage between the output terminals 28, 28'. Since the measurement of the current can be accomplished instantaneously, it is possible to make an accurate and momentary measurement of the flow rate at any moment by the use of this apparatus.

The polarity of the ions determines which one of the measurement electrodes 22 and 22' attracts the ions in the fluid flow. When the electrodes 22, 22' are connected to the DC power supply 24 in the way as illustrated in FIG. 1, positive ions are attracted to the negative electrode 22' and negative ions to the positive electrode 22. Accordingly a current is produced whether both positive and negative ions are present in the fluid or either and only one of positive and negative ions is present. Either a DC power supply or an AC power source, therefore, may be used as the high voltage generator 20 in the corona discharge circuit $C_1$.

Figure 5:
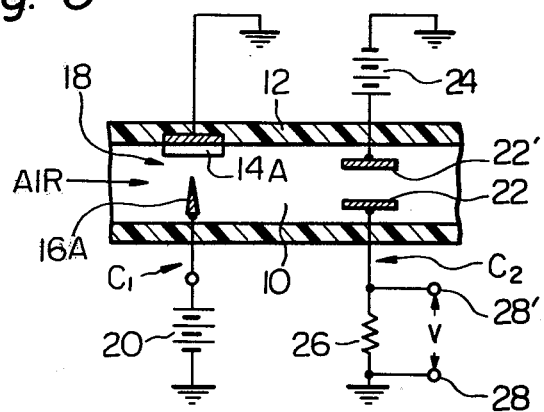
FIG. 5 shows a flow rate measuring apparatus which is analogous to that in FIG. 1 and was used in an experiment for examining the performance of apparatus according to the invention.

It will be understood that the configuration of the corona discharge electrode assembly 18 shown in FIG. 1 is an exemplary one. Each of the two electrodes 14 and 16 may have a different shape insofar as the resulting electrode assembly 18 is efficient for corona discharge and offers little resistance to the flow of the fluid. The measurement electrodes 22, 22' too may be shaped variously. When these electrodes 22, 22' are so shaped as to cause little obstruction to the fluid flow, it is possible to dispose these electrodes 22, 22' entirely in the fluid passage 10 (spaced from the inner wall of the pipe 12 as illustrated in FIG. 5), with an advantage that an efficient collection of the ions can be achieved even by the application of a relatively low voltage to the electrodes 22, 22'. The measurement electrodes 22 and 22' are usually located at substantially the same distance from the corona discharge electrode assembly 18, but it is also possible to arrange these electrodes 22, 22' at a short distance therebetween in the direction F of the fluid flow.

Referring to FIG. 5, the performance of a flow rate measuring apparatus fundamentally similar to that shown in FIG. 1 was examined for a flow of air in the cylindrical pipe 12. In this case the corona discharge electrode assembly 18 was a combination of a semicylindrical electrode 14A and a needle-shaped electrode 16A arranged radially of the electrode 14A, and a DC power source used as the voltage generator 20 for corona discharge was adjusted to apply a DC voltage of 6 kV to the electrodes 14A, 16A. The measurement electrodes 22 and 22' both had the shape of a rectangular plate and were disposed entirely in the fluid passage 10 to lie both parallel to the axis of the pipe 12. The DC power supply 24 in the measurement circuit $C_2$ developed a constant voltage of 8 kV. The load resistor 26 had a resistance of 5 MΩ. The output voltage v, i.e. a voltage across the resistor 26, was measured while the volume rate of flow of air through the passage 10 was varied within the range from 0 to 2000 liters per minute.

Figure 6:
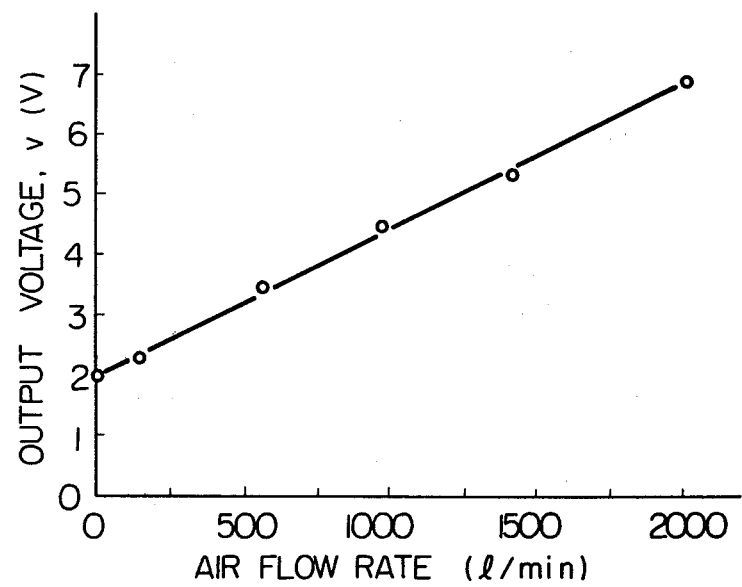
FIG. 6 is a graph showing an experimentally confirmed output characteristic of the apparatus of FIG. 5 for a flow of air.

The result of this experiment is graphically presented in FIG. 6. As can be seen in this graph, the output voltage v exhibited an exactly linear variation over the entire range, a very wide range, of the variation in the flow rate of air. This experimental result demonstrates a high precision in the measurement of either a considerably high flow rate or a very low flow rate made by the method according to the invention.

The ionization or charging of the fluid by the corona discharge circuit $C_1$ makes it possible to measure the flow rate of even a fluid having a very low conductivity such as air or gasoline by the use of this apparatus. The inclusion of the DC power source 24 in the measurement circuit $C_2$ to produce an electric field between the electrodes 22, 22' serves for efficient and accurate detection of the quantity of ions in the fluid as a current flowing between the electrodes 22, 22'. Since this flow rate measuring apparatus has advantages as described hereinbefore and provides the result of the measurement as an electrical signal, this apparatus is quite suitable for the measurement of an air flow rate and/or a fuel flow rate in electrically or electronically controlled fuel injection systems and air/fuel ratio control systems for automotive internal combustion engines.

It will be understood that the apparatus of the invention can be used also for the measurement of a linear velocity of a fluid flow.

The degree of ionization of a fluid caused by the corona discharge circuit $C_1$ of a flow rate measuring apparatus according to the invention depends on chemical and physical properties, primarily the conductivity, of the fluid. Accordingly the relationship between a fluid flow rate in the fluid passage 10 and the output voltage of the apparatus differs with fluids, assuming that parameters of the corona discharge circuit $C_1$ and measurement circuit $C_2$ of the apparatus are fixed. If it is intended to pass two or more different kinds of fluids alternately through a fluid passage equipped with the flow rate measuring apparatus and measure the flow rate for each fluid, there is the need of calibrating the apparatus for the respective fluids and carrying out the conversion of the output voltage to the flow rate on different bases from fluid to fluid. From the same reason, even when the fluid passage 10 is used for passing only one kind of fluid, errors may occur in the measurement of the flow rate by variations in certain additives or impurities contained in the fluid. For gasoline, for example, the degree of ionization under a constant corona discharge condition may vary depending on some factors of the gasoline such as the origin, grade, method of rectification and/or lead content.

The above described inconvenience or inaccuracy in measuring flow rate for different fluids is obviated by giving the apparatus of FIG. 1 an additional function of detecting the conductivity of each fluid passed through the fluid passage 10 and automatically correcting the level of the output voltage of the apparatus. The conductivity of a fluid in the passage 10 can be detected by measuring a minute current flowing through the measurement circuit $C_2$ while no voltage is applied to the corona discharge electrode assembly 16. Embodiments of a flow rate measuring apparatus having such corrective function will be described with reference to FIGS. 2–4.

Figure 2:
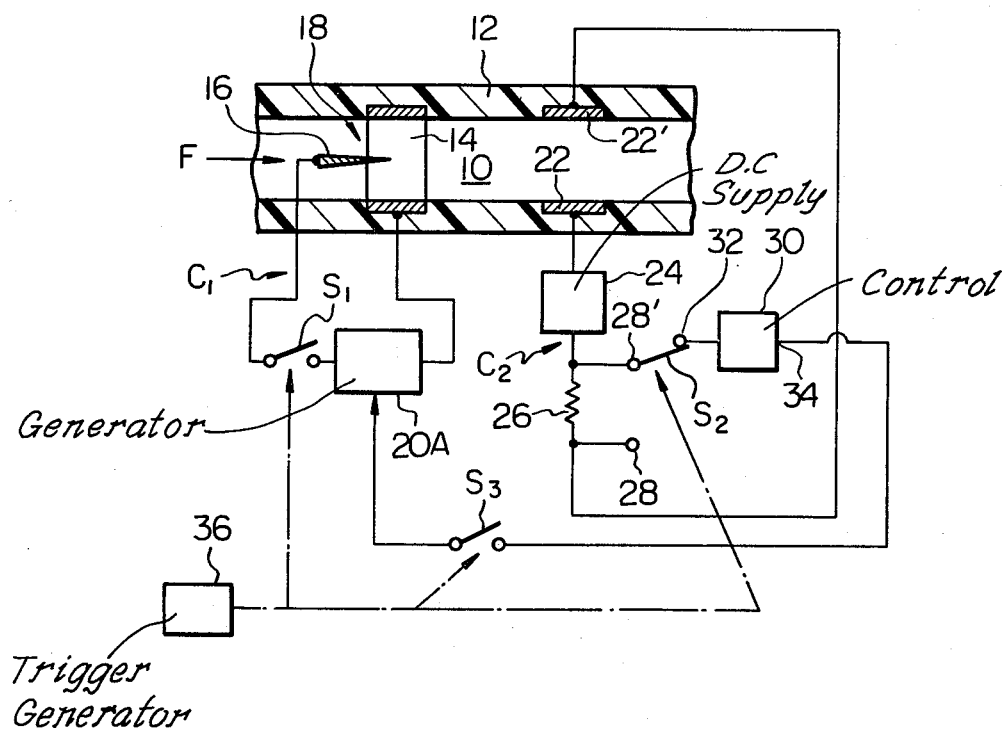
FIGS. 2–4 show respectively three different modifications of the measuring apparatus in FIG. 1.

In FIG. 2, the apparatus of FIG. 1 is modified so as to accomplish self-adjustment of its output voltage level to the conductivity of each fluid by regulating the voltage applied to the corona discharge electrode assembly 18.

The corona discharge circuit $C_1$ in FIG. 2 is similar to that in FIG. 1 except that a switch $S_1$ is included to break this circuit $C_1$ in case of need and that a high voltage generator 20A used in this case can vary its output voltage in response to an electrical signal described hereinafter. The apparatus includes a control circuit 30 which comprises a memory circuit. The input terminal 32 of the control circuit 30 is connectable to the output terminal 28' (the junction between the DC power source 24 and the resistor 26) with a switch $S_2$, and the output terminal 34 of the circuit 30 is connectable to the voltage generator 20A with a switch $S_3$. The three switches $S_1$, $S_2$ and $S_3$ are linked so as to act simultaneously in the following way. While the switch $S_1$ is in the closed state, the switch $S_3$ too remains closed and the switch $S_2$ cuts the connection between the output terminal 28' and the control circuit 30. The opening of the switch $S_1$ is accompanied by the opening of the switch $S_3$ and the closure of the switch $S_2$ to connect the output terminal 28' to the control circuit 30.

When there is a need of adjusting the output voltage level of this flow rate measuring apparatus, the corona discharge circuit $C_1$ is made inoperative by opening the switch $S_1$. In this state, a minute current (usually of the order of microampere) flowing through the measurement circuit $C_2$ (represented by a voltage across the load resistor 26) is proportional to the conductivity of the fluid in the passage 10. The intensity of this current, i.e. the output voltage of the measuring apparatus in this state, is memoried in the control circuit 30. Then the switch $S_1$ is closed together with the switch $S_3$, so that the switch $S_2$ cuts the connection between the control circuit 30 and the measurement circuit $C_2$. At this instant, the control circuit 30 supplies a control signal based on the memoried output voltage of the measurement circuit $C_2$ to the high voltage generator 20A. In response to this control signal, the voltage generator 20A varies its output voltage. Since, while the corona discharge circuit $C_1$ is inoperative, the output voltage of the measurement circuit $C_2$ takes a relatively high value if the fluid in the passage 10 has a relatively high conductivity and hence can be ionized relatively easily, the voltage generator 20A develops a relatively low output voltage so as to lower the degree of ionization of the fluid by the corona discharge if the control signal implies a relatively high output voltage of the measurement circuit $C_2$. The voltage generator 20A raises its output voltage when the control signal implies a relatively low output voltage of the circuit $C_2$. The control circuit 30 and the voltage generator 20A are designed so as to realize a definite relationship between the flow rate of the fluid in the passage 10 and the quantity of ions formed in a volume of the fluid by the action of the corona discharge circuit $C_1$ irrespective of the conductivity of the fluid. Thus, the output voltage of the apparatus of FIG. 2 can always have a definite relationship with the volume flow rate of a fluid in the passage 10 even though changes occur in the physical properties of the fluid.

The above described adjustment of the corona discharge voltage may be accomplished by manual changeover of the switches $S_1$, $S_2$ and $S_3$ when need arises, but it will be more convenient to employ an automatic changeover method in which relays or electronic switches are used as the switches $S_1$, $S_2$ and $S_3$ with the provision of a trigger signal generator indicated at 36 in FIG. 2. In such an automatic method, the switches $S_1$, $S_2$ and $S_3$ are designed such that the state illustrated in FIG. 2 (the switches $S_1$ and $S_3$ are opened and the switch $S_2$ connects the control circuit 30 with the measurement circuit $C_2$) is brought about upon receipt of a trigger signal but is maintained only for a preset amount of time thereafter (meaning automatic closure of the switches $S_1$, $S_3$, and opening of the switch $S_2$). The trigger signal generator 36 may be of the type producing a pulse signal periodically at prescribed intervals. Alternatively, a trigger signal may be supplied to the switches $S_1$, $S_2$ and $S_3$ only at specific opportunities; for example, at the beginning of the flow rate measurement and/or at the change of fluids to be passed through the passage 10. When the apparatus of the invention is applied to a fuel passage for an automotive engine, it will be favorable for an accurate measurement of the fuel supply rate that a trigger signal for the examination of the conductivity of the fuel is produced at starting of the engine and/or upon arrival of the liquid surface in the fuel tank at a predetermined level.

Figure 3:
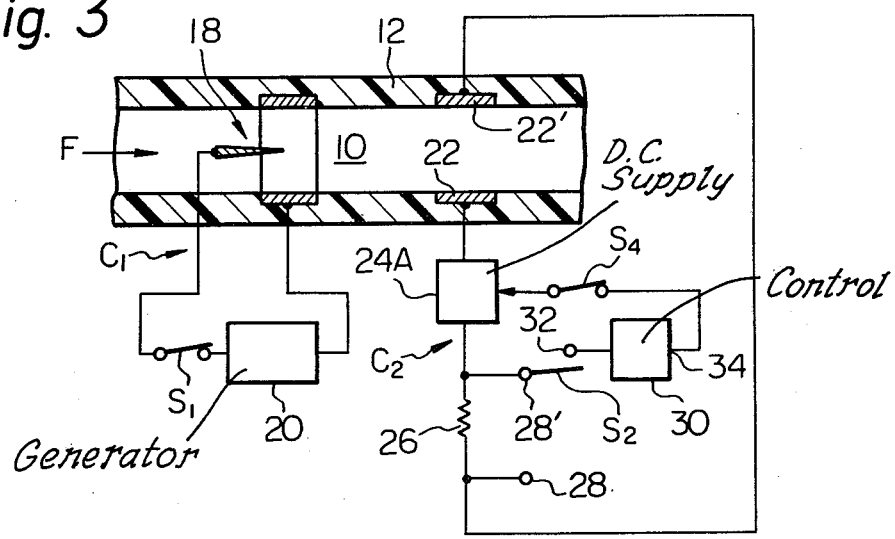

In FIG. 3, the apparatus of FIG. 1 is modified so as to accomplish the above described self-adjustment of its output voltage by regulating the voltage applied to the measurement electrodes 22, 22'.

The corona discharge circuit $C_1$ of this apparatus includes the switch $S_1$ described hereinbefore with reference to FIG. 2. The measurement circuit $C_2$ is provided with the control circuit 30 and the switch $S_2$ in the same manner as in the apparatus of FIG. 2. A DC power source 24A employed in the measurement circuit $C_2$ in FIG. 3 can apply a constant voltage to the electrodes 22, 22', but the absolute value for the constant voltage can be varied by the application of an electrical signal. The output terminal 34 of the control circuit 30 is connectable to the DC power source 24A via a normally open switch $S_4$. The switches $S_1$, $S_2$ and $S_4$ are linked so as to act simultaneously. The switches $S_1$ and $S_2$ in FIG. 3 are closed and opened in the same way as those in FIG. 2, and the switch $S_4$ acts similarly to the switch $S_3$ in FIG. 2. Accordingly, a relatively low voltage is impressed across the measurement electrodes 22, 22' to lessen the contribution of the ions in the fluid to the current through the circuit $C_2$, if the control signal supplied from the control circuit 30 to the DC voltage source 24A implies a relatively high output voltage of the circuit $C_2$ while the corona discharge circuit $C_1$ is inoperative.

Figure 4:
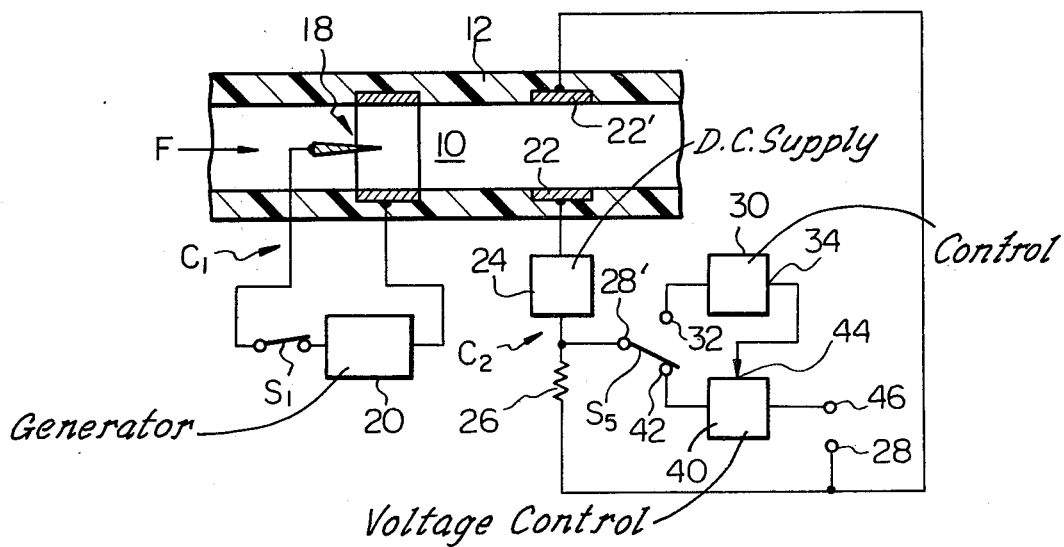

In FIG. 4, the apparatus of FIG. 3 is modified so as to accomplish the self-adjustment of its output voltage by controlling a voltage developed across the load resistor 26 instead of controlling a voltage applied to the electrodes 22, 22'.

The measurement circuit $C_2$ in FIG. 4 includes a voltage control circuit 40 in addition to the control circuit 30 (comprising a memory circuit). A switch $S_5$ can connect the terminal 28', i.e. the junction between the DC power source 24 and the load resistor 26, to either the input terminal 32 of the control circuit 30 or an input terminal 42 of the voltage control circuit 40, but the terminal 28' is normally connected to the terminal 42. The output terminal 34 of the control circuit 30 is connected to another input terminal 44 of the voltage control circuit 40. In this apparatus, the output voltage of the measurement circuit $C_2$ is a voltage between the terminal 28 (the junction between the electrode 22' and the load resistor 26) and an output terminal 46 of the voltage control circuit 40. The switch $S_5$ is linked with the switch $S_1$ in the corona discharge circuit $C_1$ to act simultaneously. When the switch $S_1$ is opened, the switch $S_5$ cuts the connection of the terminal 28' with the voltage control circuit 40 and instead connects the terminal 28' to the control circuit 30, so that a current flowing through the circuit $C_2$ in this state is memorized in the control circuit 30. Upon closure of the switch $S_1$, the switch $S_5$ connects the terminal 28' again to the voltage control circuit 40. The control circuit 30 supplies a control signal to the voltage control circuit 40 based on the intensity of the current transmitted from the terminal 28'. If the control signal implies that a relatively large current flows between the electrodes 22, 22' while the corona discharge circuit $C_1$ is inoperative, the voltage control circuit 40 functions such that the voltage across the terminals 28 and 46 becomes lower than the voltage across the terminals 28 and 28'.

The changeover of the switches in FIG. 3 or FIG. 4 may be accomplished by means of a trigger signal as described with reference to FIG. 2. The three methods illustrated by FIGS. 2-4 may be employed jointly in any combination.

What is claimed is:

1. A method of measuring the rate of a fluid flow, comprising the steps of:
    preparing a DC circuit to allow a current to flow across a flow of a fluid at a section thereof;
    continually establishing corona discharge in another section of said flow upstream of said section to partially ionize said fluid such that a constant quantity of ions per unit volume of said fluid are formed;
    measuring a current flowing through said DC circuit due to the presence of said ions in said fluid passing through said section;
    temporarily stopping the establishment of said corona discharge;
    measuring a current flowing through said DC circuit while the establishment of said corona discharge is stopped thereby to detect inherent conductivity of said fluid; and
    adjusting at least one of (i) a voltage for establishing said corona discharge; (ii) a voltage impressed on said flow by said DC circuit and (iii) a constant of said DC circuit for detecting a current flowing therethrough such that the intensity of said current flowing through said DC circuit as the result of said corona discharge has a definite relationship with the rate of said flow irrespective of the inherent conductivity of said fluid.

2. A method as claimed in claim 1, wherein said DC circuit has a pair of electrodes disposed in said section of said flow and spaced from each other in a direction generally normal to the direction of said flow.

3. An apparatus for measuring the rate of a flow of a fluid in a fluid passage, comprising:
    a set of corona discharge electrodes spaced and disposed in a section of said fluid passage;
    first means for continually establishing corona discharge across said corona discharge electrodes to partially ionize a fluid flowing through said passage such that a constant quantity of ions per unit volume of said fluid are formed;
    a pair of measurement electrodes spaced and disposed in said fluid passage to another section downstream of said section;
    second means for applying a constant DC voltage to said measurement electrodes;
    third means for measuring a current flowing between said measurement electrodes when the partially ionized fluid passes through the gap between said measurement electrodes;
    fourth means for temporarily making said first means inoperative;
    fifth means for memorizing a current flowing between said measurement electrodes while said fourth means are operating thereby to detect inherent conductivity of said fluid; and
    sixth means for adjusting the function of at least one of said first, second and third means according to the current memorized by said fifth means thereby to adjust the relationship between the rate of said flow and the intensity of said current measured by said third means while said first means are operating.

4. An apparatus as claimed in claim 3, wherein said measurement electrodes are spaced from each other in a direction generally normal to the direction of said flow.

5. An apparatus as claimed in claim 4, wherein said third means comprise a resistor connected in series with said measuring electrodes, so that said current is represented by a voltage across said resistor.

6. An apparatus as claimed in claim 3, wherein said first means comprise a high voltage generator capable of applying a constant voltage to said corona discharge electrodes, the magnitude of said constant voltage being regulatable according to the current memorized by said fifth means through the operation of said fourth means.

7. An apparatus as claimed in claim 3, wherein said second means comprise a DC power source capable of applying a constant DC voltage to said measurement electrodes, the magnitude of said constant DC voltage being regulatable according to the current memorized by said fifth means through the operation of said fourth means.

8. An apparatus as claimed in claim 3, wherein said third means comprise a resistor connected in series with said measurement electrodes to represent a current to be measured by said third means by a voltage across said resistor, and seventh means for varying said voltage across said resistor according to the current memorized by said fifth means.

9. An apparatus as claimed in claim 3, further comprising eighth means for electrically actuating both said fourth and fifth means periodically at predetermined intervals.

10. An apparatus as claimed in claim 3, further comprising eighth means for electrically actuating both said fourth and fifth means in response to a prescribed change in the supply of a fluid to said fluid passage.

* * * * *